(12) United States Patent
Bauchot et al.

(10) Patent No.: US 11,618,663 B2
(45) Date of Patent: Apr. 4, 2023

(54) AUTOMATIC BULK ITEM DISPENSER MEASUREMENT SYSTEM

(71) Applicant: International Business Machines Corporation, Armonk, NY (US)

(72) Inventors: Frédéric Bauchot, Saint-Jeannet (FR); Joel Viale, Vence (FR); Zsolt Szalai, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/194,347

(22) Filed: Mar. 8, 2021

(65) Prior Publication Data
US 2022/0281733 A1 Sep. 8, 2022

(51) Int. Cl.
| | | |
|---|---|---|
| *B67D 1/08* | (2006.01) | |
| *A47F 1/035* | (2006.01) | |
| *G07F 13/06* | (2006.01) | |
| *G06Q 20/32* | (2012.01) | |
| *B67D 1/04* | (2006.01) | |
| *B67D 1/00* | (2006.01) | |

(52) U.S. Cl.
CPC ............ *B67D 1/0888* (2013.01); *A47F 1/035* (2013.01); *B67D 1/0022* (2013.01); *B67D 1/0412* (2013.01); *B67D 1/0884* (2013.01); *G06Q 20/3276* (2013.01); *G07F 13/065* (2013.01)

(58) Field of Classification Search
CPC .... G06K 9/6267; G06K 9/62; G06Q 30/0283; G06Q 20/322; G06Q 20/3276; G06T 7/70; G06V 10/40; G06V 20/62; G06V 20/60; G06V 30/10; G06V 20/68; B67D 1/0888; B67D 1/0022; B67D 1/0412; B67D 1/0884; A47F 1/035; G07F 13/065
See application file for complete search history.

(56) References Cited

U.S. PATENT DOCUMENTS

| | | | |
|---|---|---|---|
| 4,619,379 A | | 10/1986 | Biehl |
| 4,790,457 A | * | 12/1988 | Morse ..................... A47F 1/035 |
| | | | 222/533 |
| 413,767 A | | 9/1999 | Elmore |
| 6,182,864 B1 | | 2/2001 | Elmore |
| 8,800,825 B2 | | 8/2014 | Ricciardi, Sr. |
| 2003/0180129 A1 | | 9/2003 | Lonardi |
| 2006/0238346 A1 | | 10/2006 | Teller |
| 2013/0035787 A1 | | 2/2013 | Canter |
| 2013/0325172 A1 | | 12/2013 | Crisp, III |
| 2015/0186984 A1 | * | 7/2015 | Loganathan .......... G07F 9/0235 |
| | | | 705/27.1 |

(Continued)

FOREIGN PATENT DOCUMENTS

| | | |
|---|---|---|
| CN | 2820760 Y | 9/2006 |
| EP | 1159224 B1 | 4/2012 |
| WO | 2009021625 A1 | 2/2009 |

*Primary Examiner* — Donnell A Long
(74) *Attorney, Agent, or Firm* — Erika R. DeCosty

(57) ABSTRACT

A computer-implemented method for indicating to a user an amount of an item to dispense from a bulk item dispenser is disclosed. The computer-implemented method includes detecting a real-world scale located on the bulk item dispenser. The computer-implemented method further includes overlaying an augmented scale onto the bulk item dispenser, wherein the augmented scale is positioned with respect to the real-world scale located on the bulk item dispenser.

8 Claims, 3 Drawing Sheets

(56) References Cited

U.S. PATENT DOCUMENTS

| | | |
|---|---|---|
| 2016/0196711 A1 | 7/2016 | Castellani |
| 2018/0218562 A1 | 8/2018 | Conway |
| 2022/0138465 A1* | 5/2022 | Herz .................. G06Q 30/0283 |
| | | 382/103 |

* cited by examiner

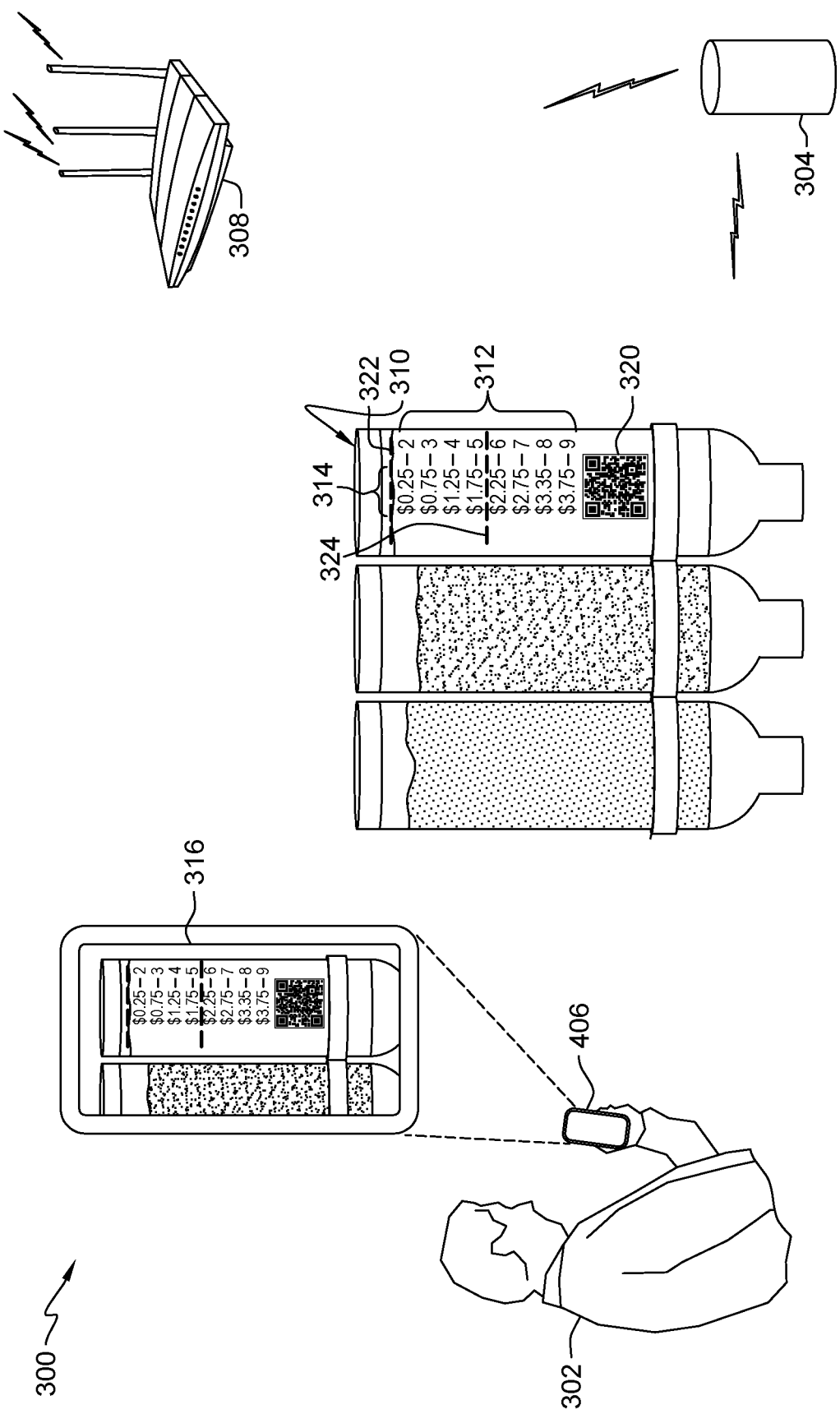

AUTOMATIC BULK ITEM DISPENSER MEASUREMENT SYSTEM

BACKGROUND

The present invention relates generally to the field of measuring quantities of bulk items, and more particularly to measuring the quantity of items dispensed from a bulk dispenser.

Consumers often desire to purchase items in bulk. Stores and markets offer items in bulk to consumers as opposed to prepackaged items. Items in bulk are typically sold by price per quantity of items. Food sold in bulk can include nuts, seeds, and dried berries and are typically sold for a price per pound or kilogram. Different food sold in bulk have different prices per pound and nutritional information.

Oftentimes, the food sold in bulk are stored in food dispensers which allow the consumer to fill a container to their desired amount. After the consumer has filled the container to the desired amount, the consumer can either weight the container of food immediately after or can bring the container of food to a register in order to weight the food.

SUMMARY

According to one embodiment of the present invention, a computer-implemented method for indicating to a user an amount of an item to dispense from a bulk item dispenser is disclosed. The computer-implemented method includes detecting a real-world scale located on the bulk item dispenser. The computer-implemented method further includes overlaying an augmented scale onto the bulk item dispenser, wherein the augmented scale is positioned with respect to the real-world scale located on the bulk item dispenser.

According to another embodiment of the present invention, a computer program product for indicating to a user an amount of an item to dispense from a bulk item dispenser is disclosed. The computer program product includes one or more computer readable storage media and program instructions stored on the one or more computer readable storage media. The program instructions include instructions to detect a real-world scale located on the bulk item dispenser. The program instructions further include instructions to overlay an augmented scale onto the bulk item dispenser, wherein the augmented scale is positioned with respect to the real-world scale located on the bulk item dispenser.

According to another embodiment of the present invention, a computer system for indicating to a user an amount of an item to dispense from a bulk item dispenser is disclosed. The computer system includes one or more computer processors, one or more computer readable storage media, and computer program instructions, the computer program instructions being stored on the one or more computer readable storage media for execution by the one or more computer processors. The program instructions include instructions to detect a real-world scale located on the bulk item dispenser. The program instructions further include instructions to overlay an augmented scale onto the bulk item dispenser, wherein the augmented scale is positioned with respect to the real-world scale located on the bulk item dispenser.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 is a block diagram of an operational environment, generally designated 300, in accordance with at least one embodiment of the present invention.

Figure 1:
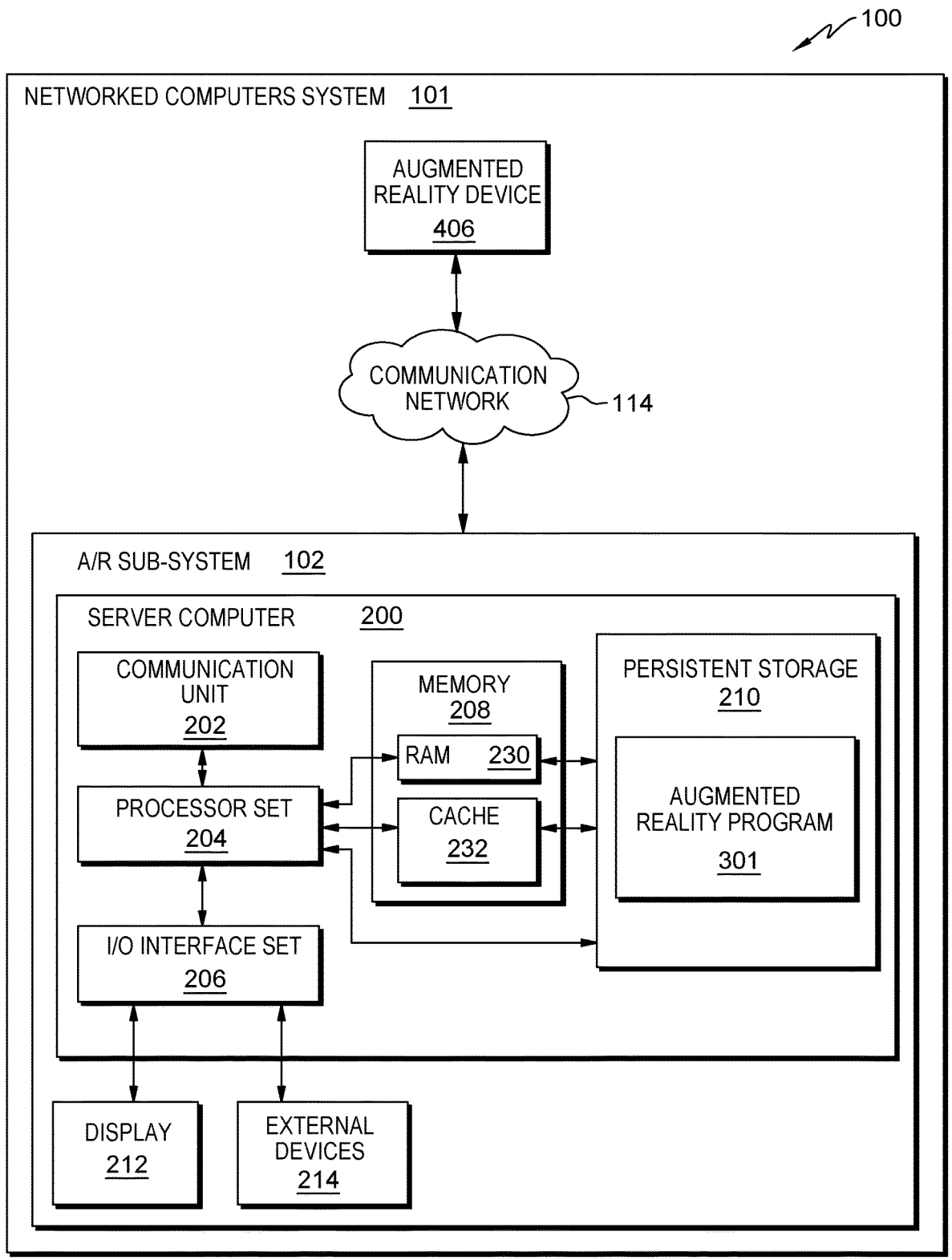
FIG. 1 is a block diagram of a system, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Bulk item dispensers allow consumers to purchase only the quantity or amount of items they need as opposed to prepackaged items which are not always representative of the consumers desired quantity. Typically, bulk items are stored in large containers with levers which release the bulk item. For example, a consumer can collects food dispensed from a bulk food dispenser into a smaller container or bag. Oftentimes, a consumer knows how much bulk food they would like to purchase. For example, a consumer may need a particular amount of food for a given recipe or the consumer may only want to spend a given amount of money on a particular food item. However, embodiments of the present invention recognize that it is difficult for a consumer to estimate by volume or weight how much food to dispense from a bulk dispenser, especially when the bulk food dispenser is devoid of any markings. This often lends the consumer to guess when to stop the food from being dispensed. Frequently, consumers are stuck pouring out and wasting food or items they do not need, purchasing too much unneeded food, or refilling and weighing their container multiple times until the desired quantity is reached. Embodiments of the present invention recognize that consumers oftentimes need to manipulate the amount of food or items in their container multiple times in order to receive the desired amount which not only wastes food product but also time.

Bulk food dispensers in grocery stores and food markets typically label each bulk food dispenser with the nutritional value, price, and other information of the bulk food located in the respective dispenser. Bulk food dispensers are typically stacked on top of each other with small labels making it difficult for a consumer to read and learn about the bulk food product. Embodiments of the present invention recognize consumers need an easier way to read and understand the information about the food located in each bulk food dispenser. Embodiments of the present invention display information associated with the contents of bulk food containers on a consumer's handheld personal device.

Bulk food dispensers in grocery stores and food markets also leave open the opportunity for a consumer to commit fraud. Current designs of bulk food dispensers allow consumers to either mix different bulk foods in one container and then to purchase or select a different price (e.g., a price associated with the cheapest item) for the weighted bulk food. Embodiments of the present invention further recognize current bulk food dispensers require either the consumer or a cashier to weigh the food product desired to be purchased in order to determine the price for a given amount of food.

Embodiments of the present invention improve upon the foregoing deficiencies of purchasing food from a bulk dispenser by determining and indicating to a user how much product within the bulk item dispenser is required to be dispensed in order to receive the users desired amount of bulk item. According to embodiments of the present invention, a label encoding information relative to the food in the bulk food dispenser is scanned by a consumer on their mobile device. For example, the label may be in the form of a QR code that is read by a camera on a smartphone. In these instances, relevant information concerning the food and the dispenser apparatus is displayed on the consumers mobile device responsive to scanning a label or QR code. In addition, the label or QR code may contain information on the size, dimensions, volume, or density of the contents within the bulk item container. In an embodiment, an augmented scale is generated and overlaid on a bulk item dispenser with augmented reality. In an embodiment, the location of the top of the upper food level is determined and an augmented marker is overlaid on the bulk food dispenser signifying the topmost level of the food in the dispenser. In an embodiment, the proportions of increment lines and the location of increment lines included in the augmented scale are adjusted based on the amount of food located in the dispenser and the size of the dispenser itself.

According to embodiments of the present invention, a consumer can input the desired amount of food they want to purchase. Based on the input amount, an augmented scale is overlaid onto the bulk food dispenser via augmented reality that indicates how much food the consumer needs to dispense from the bulk food dispenser. For example, the augmented scale will include a line or marker indicator where the consumer should stop dispensing food in order to receive their desired amount of food.

Accordingly, by enabling a consumer to input the amount of food they desire to purchase and virtually indicating that amount of desired food in the bulk food dispenser, the consumer will only receive the amount of food they need. In addition, the consumer can re-scan the label and the remaining upper food level of the food remaining in the bulk container to determine the amount of food collected by the consumer and a price. In these instances, this saves both the consumer and cashier time from needing to weigh the food to determine a price.

Accordingly, embodiments of the present invention further provide improvements to the aforementioned deficiencies of dispensing items in bulk by virtually indicating to a consumer the quantity or how much food needs to be left in the dispenser in order for the consumer to obtain their desired amount of bulk items.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram, generally designated 100, illustrating various portions of networked computers system 101, including: Augmented reality (A/R) sub-system 102; communication network 114; server computer 200; communications unit 202; processor set 204; input/output (I/O) interface set 206; memory device 208; persistent storage device 210; display device 212; external devices 214; random access memory (RAM) devices 230; cache memory device 232; augmented reality program 301; and augmented reality device 406.

In various embodiments of the present invention, augmented reality device 406 is a computing device that can be a laptop computer, tablet computer, netbook computer, personal computer (PC), a desktop computer, a personal digital assistant (PDA), a smartphone, smartwatch, headset, or any programmable electronic device capable of receiving, sending, and processing data. In general, augmented reality device 406 represents any programmable electronic device or combination of programmable electronic devices capable of executing machine readable program instructions and communicating with A/R sub-system 102, server computer 200, and other computing devices (not shown) within computing environment 100 via a network, such as communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems. In an embodiment, augmented reality device 406 includes one or more cameras and is capable of carrying out augmented reality capabilities.

As depicted in FIG. 1, A/R sub-system 102 is a subsystem of networked computers system 101 that provides augmented (A/R) functionality. In an alternative embodiment, A/R sub-system 102 is a subsystem of augmented reality device 406 that provides A/R functionality.

A/R sub-system 102 is shown as a block diagram with many double arrows. These double arrows (no separate reference numerals) represent a communications fabric, which provides communications between various components of A/R sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for A/R sub-system 102; and/or (ii) devices external to A/R sub-system 102 may be able to provide memory for A/R sub-system 102. Augmented reality program 301 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Augmented reality program 301 may include both machine readable and performable instructions and/or substantive data (that is, the type of data stored in a database).

In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to A/R sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external devices 214. External devices 214 can include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, augmented reality program 301, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212. Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In example embodiments, augmented reality program 301 indicates to a user the correct volume of items to dispense from a bulk item dispenser in accordance with embodiments of the present invention. In some embodiments, augmented reality program 301 displays one or more augmented scales or markers on a bulk container indicating the amount of items or food that should be dispensed from the bulk container via augmented reality.

In some embodiments, augmented reality program 301 receives information about the contents of a bulk dispenser via user input. In some embodiments, the information of the contents of a bulk dispenser information include, but are not limited to, the nutritional value, price, source, density, or volume of the contents in the bulk dispenser. In some embodiments, augmented reality program 301 receives information about the contents of the bulk dispenser information by scanning a barcode or QR code. In some embodiments, augmented reality program 301 receives information about the contents of the bulk dispenser by receiving a numeric or alphabetical code. In an embodiment, augmented reality program 301 overlays the information about the contents of the bulk item dispenser relative to each increment line of an augmented scale overlaid onto the bulk item dispenser.

In some embodiments, augmented reality program 301 receives a desired amount, volume, price, or total items the consumer desires from the bulk item dispenser. In these embodiments, augmented reality program 301 determines the amount, volume, price, or total quantity of items which are required to be dispensed from the bulk item dispenser. For example, a user inputs they want $2.00 worth of product from the bulk item dispenser. In this example, augmented reality program 301 determines the volume of product equal to $2.00 based on the price and weight of the bulk items. For example, augmented reality program 301 determines $2.00 worth of product in a particular bulk item dispenser with a price of $8.00/pound requires ¼ of a pound of bulk items would equal $2.00 worth of product. For example, augmented reality program 301 generates an augmented scale indicating every $0.50 worth of product. In various embodiments, augmented reality program 301 overlays an augmented scale over a bulk item dispenser. In an embodiment, a first augmented marker is further overlaid onto an augmented scale, wherein a position of the first augmented marker on the augmented scale corresponds to an amount of a bulk item to be dispensed from a bulk item dispenser.

In another embodiment, augmented reality program 301 displays various information about the product contained within the bulk item dispenser. In an embodiment, augmented reality program 301 determines the volume of the bulk item dispenser or volume of content within the bulk item dispenser by receiving or determining the dimensions of the bulk item dispenser or volume of content within the bulk item dispenser. For example, based on determining the volume of the bulk item dispenser or volume of content within the bulk item dispenser, augmented reality program 301 displays the information of the corresponding price, quantity, or weight at each increment line. For example, augmented reality program 301 determines the volume of the bulk item dispenser or contents within the bulk item dispenser by receiving a photo of the dispenser with the contents or by receiving the dimensions of the bulk item dispenser or the contents within the bulk item dispenser. In an embodiment, augmented reality program 301 overlays an augmented scale over the bulk item dispenser corresponding do the volume. In an embodiment, a first augmented marker is overlaid onto an augmented scale, wherein a position of the first augmented marker on the augmented scale corresponds to the volume of a bulk item to be dispensed from a bulk item dispenser.

In some embodiments, the augmented scale includes one or more augmented increment lines. In an embodiment, increment lines indicate a measurement of volume, monetary value, or nutritional value of bulk items within a bulk item dispenser. In an embodiment, augmented reality program 301 generates one or more increment lines by determining the measurements of the bulk container or the volume of the bulk container's contents. In an embodiment, augmented reality program 301 determines the measurements of the bulk container or the volume of the bulk container's contents from information obtained by scanning the bulk containers QR code or barcode or by the user entering the bulk containers information. In an embodiment, the size, spacing, and orientation of the increment lines generated via augmented reality is based, at least in part, on one or more of the size of the bulk item container, the amount of contents remaining in the bulk item dispenser, the desired quantity of items requested by a consumer, the orientation of a consumer's user device with respect to the bulk item dispenser, and the distance of a consumer's user device from the bulk item dispenser. In an embodiment, the scale of the increment lines is modified based on volume of the bulk item dispenser.

In an embodiment, augmented reality program 301 generates the augmented scale based on the input from the user indicating their desired quantity of bulk items from the bulk item dispenser. For example, if a user indicates they desire $2.00 worth of items from the bulk item container, augmented reality program 301 displays the augmented scale lines with price increments. For example, augmented reality program 301 displays an augmented scale line for every $0.50 worth of items. In an embodiment, user indicates they desire the scale to be in a monetary amount. In this embodiment, augmented reality program 301 displays the monetary amount of product at each augmented scale line.

In some embodiments, augmented reality program 301 overlays the increments lines with augmented reality starting from the upper level of the items in the bulk item dispenser. In an embodiment, augmented reality program 301 overlays increment lines corresponding to real-world markers or lines on the bulk item dispenser. For example, the augmented reality increment scale lines line up with the real-word scale lines. In an embodiment, augmented reality program 301 overlays a second augmented marker onto the augmented scale, wherein a position of the second augmented marker on the augmented scale corresponds to a topmost level of the items contained within the bulk item dispenser. In an embodiment, augmented reality program 301 dynamically alters a position of the second augmented marker as a position of the bulk items contained within the bulk item dispenser changes.

In some embodiments, the increment lines indicate corresponding price, volume, weight, calories, or other desired increments. In some embodiments, one or more increment lines indicate the desired amount, volume, or total quantity of items which are required to be dispensed from the bulk item dispenser. In an embodiment, overlaying the augmented scale onto the bulk item dispenser is based on determining at least one of an orientation and a distance of a user with respect to the bulk item dispenser. In an embodiment, augmented reality program 301 adjusts or modifies the position or size of the augmented scale with respect to the bulk item dispenser as the user moves closer or farther away from the bulk item dispenser. For example, as a user (and thereby a user device of the user) moves closer to the bulk item dispenser, augmented reality program 301 increases the size of the augmented scale. In another example, as a user (and thereby a user device of the user) moves further away from the bulk item dispenser, augmented reality program 301 decreases the size of the augmented scale. In yet another example, if a user changes the orientation of their user device with respect to the bulk item dispenser, augmented reality program 301 adjusts the position of the augmented scale such that the augmented scale remains centered with respect to the bulk item dispenser.

In an embodiment, overlaying the scale onto the bulk item dispenser is further based on detecting a real-world scale physically located on the bulk item dispenser and positioning the augmented scale with respect to the real-world scale located on the bulk item dispenser. For example, augmented reality program 301 may detect, via a camera on a user's mobile device, a real-world physical scale printed on the bulk item dispenser. In response to detecting the scale printed on the bulk item dispenser, augmented reality program 301 overlays the augmented scale onto the bulk item dispenser such that any augmented increment lines of the augmented scale line up with the increment lines of the real-world scale.

In some embodiments, augmented reality program 301 receives a first photograph, video, or multimedia depicting the top of the bulk items located within the bulk item dispenser. In these embodiments, augmented reality program 301 determines the location of the top of the items or food located within the bulk item dispenser within the first photograph, video, or multimedia. In an embodiment, the user wears an augmented reality system device (A/R subsystem 102), and interacts vocally, and/or by using physical gestures picked up by imaging device(s) (camera(s), for example). In some embodiments, A/R sub-system 102 comprises a smartphone. In an embodiment, augmented reality program 301 generates a first timestamp for when the first photograph was generated.

In an embodiment, augmented reality program 301 receives a second photograph, video, or multimedia depicting the top of the bulk items located within the bulk item dispenser. In an embodiment, augmented reality program 301 generates a second timestamp for when the second photograph was generated. In these embodiments, augmented reality program 301 determines the location of the top of the items or food located within the bulk item dispenser within the second photograph, video, or multimedia. In an embodiment, augmented reality program 301 compares the top of the items or food within the bulk item dispenser with the first photograph, video, or multimedia to the second photograph, video, or multimedia to determine the difference of food or items within the bulk item dispenser. In an embodiment, augmented reality program 301 subtracts the difference of the top of the items between the first picture and the second picture to determine the amount of items dispensed. In an embodiment, augmented reality program 301 determines the difference of time between the first timestamp and the second timestamp.

In an embodiment, augmented reality program 301 determines an amount of a bulk item dispensed from a bulk item dispenser based, at least in part, on comparing a first-time stamped image of the bulk item dispenser overlaid with the augmented scale and a first augmented marker signifying a topmost portion of the contents of the bulk item dispenser prior to dispensing the bulk item to a second time-stamped image of the bulk item dispenser overlaid with the augmented scale and a second augmented marker signifying a topmost portion of the contents of the bulk item dispenser after completion of dispensing the bulk item.

For example, the first image contains the overlaid augmented reality increment lines and depict where the items within the bulk item container line up with the augmented reality increment lines. Further, the second image contains the overlaid augmented reality increment lines and depict where the items with items within the bulk item container line up with the augmented reality lines after dispensing. Based on the movement of items within the bulk item container with respect to the augmented reality lines, augmented reality program 301 calculates the amount or volume of items dispensed.

In an embodiment, augmented reality program 301 validates the determined amount of the bulk item dispensed form the bulk item dispenser based, at least in part, on calculating an amount of time between a first time stamp associated with the first image and a second time stamp associated with the second image being below a predetermined threshold level. For example, the amount dispensed is validated if the first image and the second image are taken within 30 seconds of the user initially beginning to dispense the bulk item from the dispenser.

In various embodiments, a validation ticket is generated when bulk product dispensing is completed. In an embodiment, augmented reality program 301 generates a validation ticket based on validating the determined amount of the bulk item dispensed from the bulk item dispenser. In an embodiment, the validation ticket includes the type of product the user collected, how much of the product the user collected, the price of the product collected, or the total price. In an embodiment, a validation ticket is locally created. For example, a validation ticket is sent to the user's mobile device. In an embodiment, augmented reality program 301 automatically transmits the validation ticket to a mobile payment application. In an embodiment, the validation ticket contains a confirmation code, barcode, or QR which is scanned or inputted at checkout. In an embodiment, a validation ticket is sent directly to the cashier. In these embodiments, the cashier can re-weigh or re-count the items collected from the bulk item dispenser to ensure they match the information given on the validation ticket to decrease fraud. In an embodiment, the validation ticket contains the first timestamp, second timestamp, or difference in time between the first timestamp and the second timestamp. In these embodiments, the validation ticket can further decrease fraud by providing information to the cashier of when the bulk items were dispensed. For example, if the cashier notices there is a large difference between the first and second timestamp the cashier can inquire to determine if all the bulk contents in a single container are the same and match the weight and price on the validation ticket.

Embodiments of the invention can be used in self-service or checkout-less stores. Self-service or checkout-less stores include stores which monitor what the customer takes while in the store and charges the customer upon departing the store. In an embodiment, a user purchase items from a bulk food container from a check-out free store. In an embodiment, augmented reality program 301 detects how much food or items a user has dispensed from a bulk item dispenser as previously explained. In an embodiment, the validation ticket is sent to the self-service store, application, or platform required to virtually checkout the user. In these embodiments, a user is automatically charged for the items they dispensed from the bulk item dispenser upon departure from the store.

Figure 2:
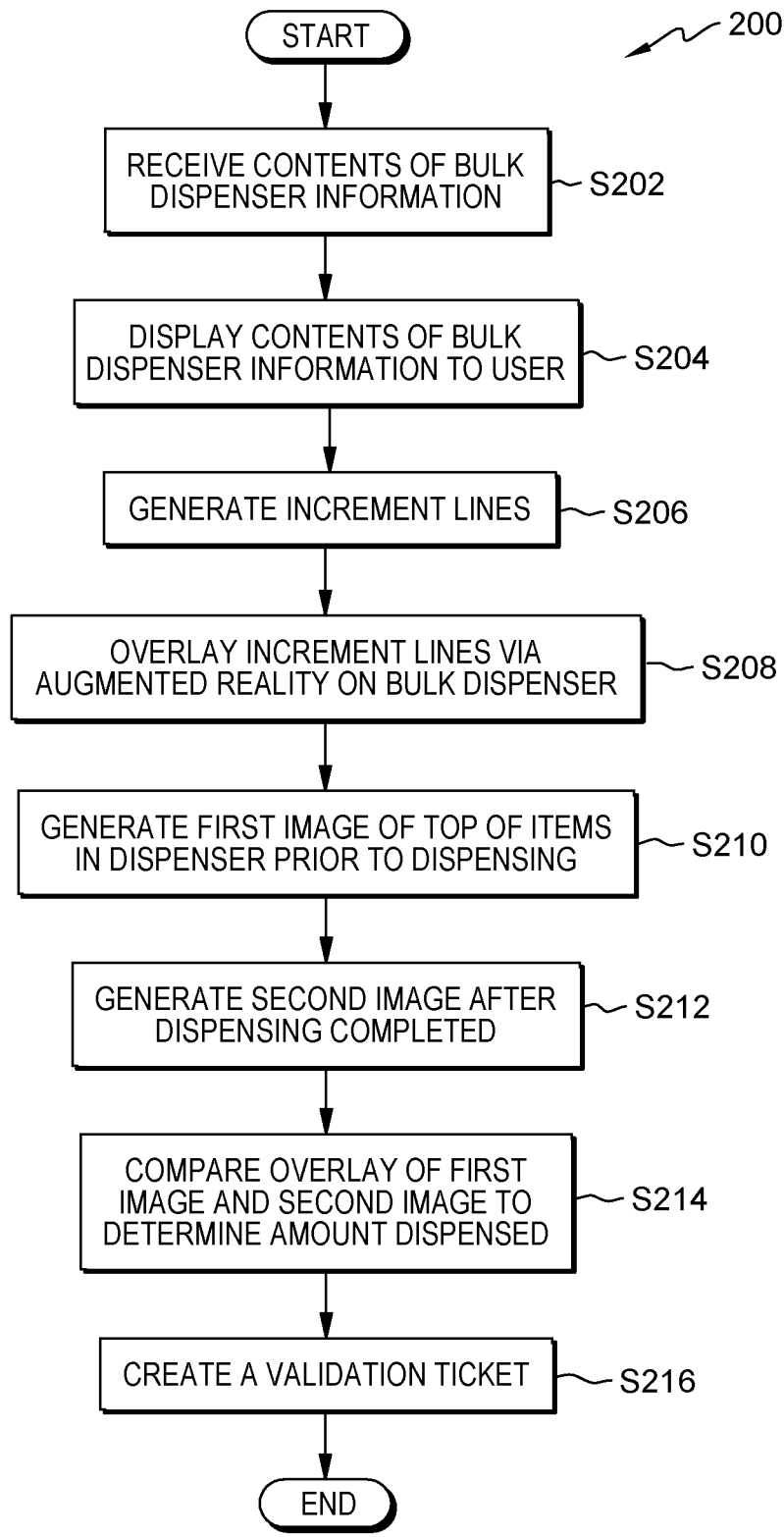
FIG. 2 is a flow chart diagram depicting operational steps for indicating to a user an amount of an item to dispense from a bulk item dispenser in accordance with at least one embodiment of the present invention.

FIG. 2 is a flow chart diagram, generally designated 200, depicting operational steps for indicating to a user an amount of an item to dispense from a bulk item dispenser in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, augmented reality program 301 receives information associated with both the contents of a bulk item dispenser as well as the bulk item dispenser itself. In an embodiment, the contents of the bulk item dispenser are displayed to the user via a graphical user interface (GUI).

At step S204, augmented reality program 301 receives user input indicating a desired amount or quantity of bulk items from a bulk item dispenser. In an embodiment, augmented reality program 301 receives user input indicating a desired amount of money that a user would like to spend on a particular bulk item from a bulk item dispenser.

At step S206, augmented reality program 301 generates an augmented scale to be overlaid onto the bulk item dispenser via augmented reality. In an embodiment, the augmented scale includes one or more increment lines. In an embodiment, the increment lines are generated based on the user input indicating the desired amount or quantity of bulk items from a bulk item dispenser. In an embodiment, the increment lines are generated based on the distance between the user and the bulk dispenser. In an embodiment, increment lines are based on the dimensions or size of the container. In an embodiment, the increment lines are based on the volume of items in the bulk item dispenser. For example, the increment lines begin at the top of the items in the bulk item dispenser.

At step S208, augmented reality program 301 overlays the augmented scale and any increment lines via augmented reality on the bulk item dispenser. In an embodiment, the increment lines of the augmented scale depict various volumes of items within the bulk dispenser. In an embodiment, an augmented marker is overlaid on the bulk item dispenser to signify where a user needs to stop dispensing items in order to receive their desired amount or quantity of items.

At step S210, augmented reality program 301 prompts a user to upload a first image of the dispenser prior to dispensing. In an embodiment, the overlaid augmented scale and increment lines are included in the first image. In an embodiment, the overlaid augmented scale and increment lines are not included in the first image.

At step S212, augmented reality program 301 prompts a user to upload a second image of the bulk item dispenser after dispensing is completed. In an embodiment, the overlaid augmented scale and increment lines are included in the second image. In an embodiment, the overlaid augmented scale and increment lines are not included in the second image.

At step S214, augmented reality program 301 compares the first image and the second image to determine the amount dispensed. In an embodiment, augmented reality program 301 determines the top of the items in the first image and the top of the items in the second image. In an embodiment, augmented reality program 301 subtracts the difference between the top of the items in the first image and the top of the items in the second image to determine the amount of items dispensed.

At step S216, augmented reality program 301 creates a validation ticket. In an embodiment, augmented reality program 301 includes the contents, volume, or price of dispensed bulk items in the validation ticket. In an embodiment, augmented reality program 301 includes the first timestamp, second timestamp, or the difference in time between the first and the second. In an embodiment, the validation includes the first and second image.

FIG. 3 depicts an operational environment, generally designated 300, in accordance with at least one embodiment of the present invention. The depicted environment includes: user 302; Artificial Intelligence (AI) smart assistant 304; augmented reality device 406; wireless router 308 connected to the internet; and enhanced reality view 316.

In the embodiment of FIG. 3, AI smart assistant 304 communicates wirelessly with augmented reality device 406 and causes augmented reality device 406 to generate and display augmented scale increment lines 314 overlaid onto bulk item dispenser 310 in user 302 field of vision. Enhanced reality view 316, displayed on screen of augmented reality device 406, shows bulk item dispenser 310, real-world scale 312, augmented scale 314, first augmented marker 322, and second augmented marker 324. AI smart assistant 304 communicates wirelessly with augmented reality device 406 and causes augmented reality device 406 to generate and display augmented scale 314.

In some embodiments of the present invention, augmented reality device 406 comprises a wearable device, such as a virtual reality (VR) or augmented reality (AR) device. These VR and AR devices may be wearable, such as a headset device coupled with a smartphone. Alternatively, the VR and AR devices may comprise a projector device (such as, for example, a vehicle or aircraft head-up display), or any type of computer display device. Further, in some embodiments, a VR or AR device may comprise a human implantable device capable of imparting to user 302, perceptions such as sights, sounds, odors, and/or haptic sensations. Such implantable devices may serve to bypass or overcome deafness, blindness, and/or other sensory deficits. In an embodiment, augmented reality device 406 is a mobile device such as a smartphone or tablet.

In some embodiments of the present invention, AI smart assistant 304, paired with augmented reality device 406, work in concert to perform at least some of the following operations, not necessarily in the following order, and/or to present interactive features that have the following characteristics: In some embodiments, AI smart assistant and augmented reality device 406 are located on the same device. In some embodiments, AI smart assistant and augmented reality device 406 are located on different devices.

(i) AI smart assistant 304 determines user possesses augmented reality device 406;

(ii) AI smart assistant 304 detects via a camera a real-world scale located on bulk item dispenser 310;

(iii) AI smart assistant 304 analyzes the distance between bulk item dispenser 310 and user 302;

(iv) AI smart assistant 304 determines the top of the items in bulk item dispenser 310 prior to dispensing items;

(v) AI smart assistant 304 identifies real world scale 312, and positions augmented scale 314 with respect to the real-world scale, and causes augmented scale 314 to appear in augmented reality device 406 for interaction with user 302; and (vi) AI smart assistant 304 determines the top of items in bulk item dispenser 310 after dispensing.

In an embodiment, user 302 approaches bulk item dispenser 310 with augmented reality device 406. In an embodiment, user scans QR code 320 on bulk item dispenser 310. In an embodiment, user manually inputs information distinguishable to bulk item dispenser 310 via augmented reality device 406. In an embodiment, the information distinguishable to bulk item dispenser 310 includes the contents, nutritional value, or price of the bulk item dispenser. In an embodiment, the information distinguishable to bulk item dispenser 310 includes the measurements of the bulk item dispenser 310.

In an embodiment, user 302 indicates their desired amount of bulk items from bulk item dispenser 310. In an embodiment, user 302 indicates their desired amount by typing it into their handheld device or augmented reality device 406. In an embodiment, user 302 speaks their desired amount of bulk items. In these embodiments, augmented reality program 301 utilizes speech to text to determine a consumers desired amount of bulk items. In an embodiment, user 302 indicates their desired amount of bulk items by weight, nutritional value, price, or measurement via user input, such as on a graphical user interface (GUI).

In an embodiment, user 302 angles augmented reality device 406 to capture the top of the items in bulk item dispenser 310. In an embodiment, augmented reality program 301 generates a first image of the top of the items in bulk item dispenser 310. In an embodiment, augmented reality program 301 determines and generates augmented scale 314. In an embodiment, augmented reality program 301 generates augmented scale 314 based on the input from user 302 indicating their desired amount of bulk items from bulk item dispenser 310. In an embodiment, augmented reality program 301 generates augmented scale 314 based on where user 302 should stop filling up their container in order to receive the previously indicated desired amount of bulk items. In an embodiment, bulk item dispenser 310 has real-world scale 312. In an embodiment, augmented scale 314 line up with real-world scale 312. In an embodiment, augmented reality program 301 generates first augmented marker 322 indicating the top of the items within bulk item dispenser 310. In an embodiment, augmented reality program 301 generates second augmented marker 324 indicating the desired amount of items within bulk item dispenser 310.

In an embodiment, user 302 angles augmented reality device 406 to capture the top of the remaining items in bulk item dispenser 310. In an embodiment, augmented reality program 301 generates a second image of the top of the remaining items in bulk item dispenser 310. In an embodiment, augmented reality program 301 determines how much or the quantity of items dispensed by user 302 from bulk item dispenser 310. In an embodiment, augmented reality program 301 determines the difference of the top of the items remaining in bulk item dispenser 310 by comparing the first image and the second image. In an embodiment, augmented reality program 301 compares the food with respect to augmented scale 314 of the first and second image to determine the amount of items dispensed from bulk item dispenser 310.

In an embodiment, augmented reality program 301 creates a validation ticket. In an embodiment, augmented reality program 301 sends the validation ticket to a user device. In an embodiment, augmented reality program 301 sends the validation ticket to the cashier. In an embodiment, the validation ticket can be scanned by the cashier. In an embodiment, augmented reality program 301 transmits the validation ticket to a mobile payment application.

What is claimed is:

1. A computer-implemented method for indicating to a user an amount of an item to dispense from a bulk item dispenser, comprising:

detecting, by one or more processors, one or more real-world lines located on the bulk item dispenser; and overlaying, by one or more processors, an augmented digital scale onto the bulk item dispenser, wherein the augmented digital scale is positioned to correspond to the one or more real-world lines located on the bulk item dispenser.

2. The computer-implemented method of claim 1, further comprising:

scanning, by one or more processors, a quick release (QR) code to retrieve information about the bulk item housed within the bulk item dispenser; and digitally overlaying, by one or more processors, the information relative to one or more increment lines of the augmented digital scale.

3. The computer-implemented method of claim 1, wherein overlaying the augmented digital scale onto the bulk item dispenser is further based on:

determining, by one or more processors, at least one of an orientation and a distance of the user with respect to the bulk item dispenser.

4. The computer-implemented method of claim 1, further comprising:

receiving, by one or more processors, user input indicating an amount of a bulk item to be dispensed from the bulk item dispenser; and digitally overlaying, by one or more processors, a first augmented digital marker onto the augmented digital scale, wherein a position of the first augmented digital marker on the augmented digital scale corresponds to the amount of the bulk item to be dispensed from the bulk item dispenser.

5. The computer-implemented method of claim 4, further comprising:

digitally overlaying, by one or more processors, a second augmented digital marker onto the augmented digital scale, wherein a position of the second augmented digital marker on the augmented digital scale corresponds to a topmost level of items within the bulk item dispenser; and dynamically altering, by one or more processors, a position of the first augmented digital marker overlaying the bulk item dispenser as a position of the bulk item with the bulk item dispenser changes.

6. The computer-implemented method of claim 5, further comprising:

determining, by one or more processors, an amount of the bulk item dispensed from the bulk item dispenser based, at least in part, on:

comparing a first time stamped image of the bulk item dispenser overlaid with the augmented digital scale and the first augmented digital marker prior to dispensing the bulk item to a second time stamped image of the bulk item dispenser overlaid with the augmented digital scale and the first augmented digital marker after completion of dispensing the bulk item.

7. The computer-implemented method of claim 6, further comprising:

validating, by one or more processors, the determined amount of the bulk item dispensed from the bulk item dispenser based, at least in part, on:

an amount of time between a first time stamp associated with the first time stamped image and a second time stamp associated with a second time stamped image being below a predetermined threshold level.

8. The computer-implemented method of claim 7, further comprising:

generating, by one or more processors, a validation ticket based on validating the determined amount of the bulk item dispensed from the bulk item dispenser; and transmitting, by one or more processors, the validation ticket to a mobile payment application.

* * * * *